(12) United States Patent
Robertson et al.

(10) Patent No.: US 8,332,509 B2
(45) Date of Patent: Dec. 11, 2012

(54) PARAMETERIZED COMPUTER MONITORING SYSTEM

(75) Inventors: James Robertson, Issaquah, WA (US);
Jeffrey Snover, Woodinville, WA (US);
Sameer Mutatkar, Sammamish, WA (US); Rahim Maknojia, Bellevue, WA (US); Christine Moeller, Redmond, WA (US); Bruce Payette, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 12/709,468

(22) Filed: Feb. 20, 2010

(65) Prior Publication Data

US 2011/0208855 A1 Aug. 25, 2011

(51) Int. Cl.
*G06F 11/30* (2006.01)
(52) U.S. Cl. .......................... 709/224; 709/220; 709/227
(58) Field of Classification Search .................. 709/224, 709/220–222, 227, 228
See application file for complete search history.

(56) References Cited

U.S. PATENT DOCUMENTS

| | | | |
|---|---|---|---|
| 6,199,099 B1 * | 3/2001 | Gershman et al. | 709/203 |
| 8,108,456 B2 * | 1/2012 | Chen et al. | 709/202 |
| 2005/0138059 A1 | 6/2005 | Cross et al. | |
| 2008/0270515 A1 * | 10/2008 | Chen et al. | 709/202 |
| 2009/0112779 A1 | 4/2009 | Wolf et al. | |
| 2009/0132702 A1 | 5/2009 | Burton et al. | |
| 2009/0284549 A1 | 11/2009 | Flynn et al. | |
| 2010/0010949 A1 | 1/2010 | Ito et al. | |

OTHER PUBLICATIONS

Yuan, et al., "Development of a GIS Service Model in Support of Online Geoprocessing", GISdevelopment.net→ GITA 2000→ Leveraging Web-Based Technologies, Sep. 14, 2003, pp. 6.
"Using Media Selector Data Model", Feb. 20, 2008, pp. 8.
Hetherington, et al., "Addressing the Challenges of Multiscale Model Management in Systems Biology", 2007, pp. 18.

* cited by examiner

*Primary Examiner* — Kenneth R Coulter (57) ABSTRACT

A computer monitoring system uses a set of parameterized models to gather information about monitored devices. The models include scripts for gathering information, as well as type validation and data validation functions. The parameters within the model are used to generate user interface prompts and to populate discovery scripts as well as data validation scripts. In some cases, the models may include localization settings that may customize the user interface and validation output for different languages. A processing engine may generate a user interface from the parameters defined in the models, customize the scripts from the user input, and cause the scripts to be executed. The data gathered by the scripts may be analyzed using type validation and data validation.

20 Claims, 3 Drawing Sheets

PARAMETERIZED COMPUTER MONITORING SYSTEM

BACKGROUND

Computer monitoring systems are often used to manage various devices in a network. The systems may gather information about network devices, such as client or server computers, and display the current status of the devices. In some embodiments, the monitoring systems may also be capable of modifying or configuring the various devices.

Computer monitoring systems are often deployed in a network environment of a company or other enterprise. The computer monitoring system may be used by information technology professionals to manage large numbers of devices in a centralized manner.

SUMMARY

A computer monitoring system uses a set of parameterized models to gather information about monitored devices. The models include scripts for gathering information, as well as type validation and data validation functions. The parameters within the model are used to generate user interface prompts and to populate discovery scripts as well as data validation scripts. In some cases, the models may include localization settings that may customize the user interface and validation output for different languages. A processing engine may generate a user interface from the parameters defined in the models, customize the scripts from the user input, and cause the scripts to be executed. The data gathered by the scripts may be analyzed using type validation and data validation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A computer monitoring system may use parameterized models to gather and validate information from various monitored computers. An engine may analyze the models, generate a user interface based on the parameters in the models, and cause scripts within the models to be executed to gather information from other devices as well as to validate the data returned from the gatherer scripts.

The models may contain the complete definition of the actions to gather and validate information, as well as the parameters used to customize those scripts for the environment in which the scripts may be operated. The scripts may be a text file that contains shell scripts, metadata, and other information, and may be updated and deployed without having to write programming code or compile the code into executable form.

The processing engine may generate a user interface to collect user input prior to executing the scripts. The user interface may be generated from the parameter metadata included in the model and may be localized to be presented in different languages.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
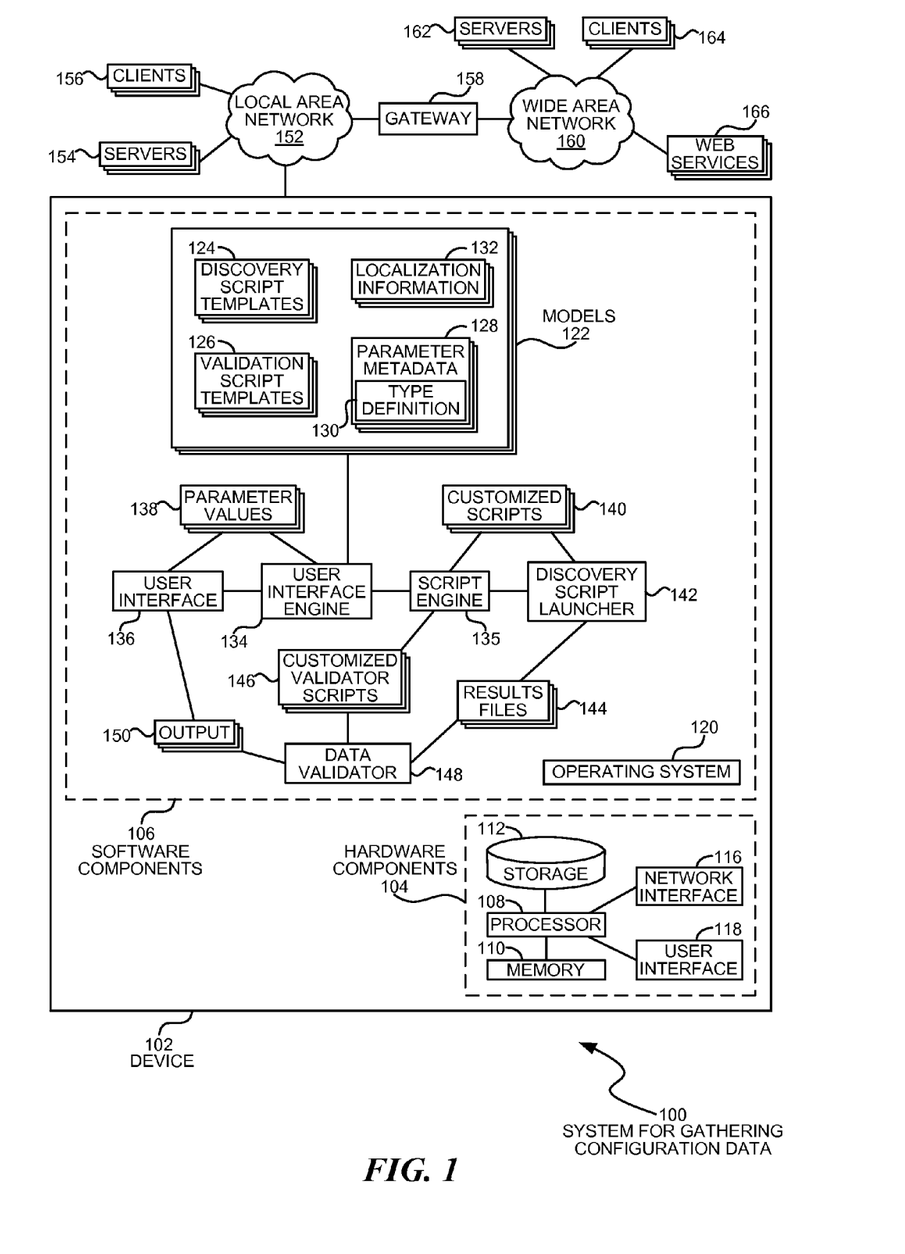
FIG. 1 is a diagram illustration of an embodiment showing an environment in which a gathering system may operate.

FIG. 1 is a diagram of an embodiment 100, showing a system for gathering configuration data from various devices. Embodiment 100 is a simplified example of a network environment in which a parameterized model may be used to generate a user interface, gather data from a user, and create customized scripts for gathering data from various devices.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is a simplified example of a system that may gather information from various devices for a device monitoring and management system. Embodiment 100 illustrates an example of a system that may use a set of models that describe the mechanisms for collecting and validating data from other devices. The mechanisms may be defined in a set of scripts or script templates that are parameterized. The parameters in the scripts may be detected and used to create a user interface through which a user may input values that are used to customize the scripts for use.

The parameters may include information that may be used by the discovery scripts as well as scripts or other mechanisms for validating the data. The parameters may be defined with various metadata such as type information so that the data received from the user interface can be checked prior to use. The parameters may also be used to create custom validation scripts that may be run against the collected data to analyze the data.

The system may collect data for a network management system. The network management system may gather configuration and status information from server devices, client devices, and other network devices, then use that information to manage the devices. Such a system may be used in an enterprise such as a company, university, or other network environment. Some embodiments may be deployed to manage networks having a handful of devices to networks with hundreds, thousands, or even tens of thousands of devices.

When gathering information in such environments, each device may have certain peculiarities or subtle differences between other devices. For example, some server devices may have a slightly different configuration or provide a slightly different set of services than other server devices.

Because of the subtle differences between devices, it can be hard to create management tools that are pre-written for specific devices. In the case of larger enterprises, the sheer numbers of devices and slight differences between devices may prohibit creating custom-written data gathering tools.

The models used by the data gathering system may be defined in a manner that is easy for an information technology professional to use. Many information technology professionals are comfortable writing scripts and use scripting technology to perform many of their day to day tasks. Such professionals are often not well versed in programming languages.

The models may be defined using scripts or script templates. The script templates may be annotated with various parameters in a manner with which information technology professionals may be comfortable. The models may be editable and modifiable by information technology professionals to adapt models to different uses and different settings.

The data gathering system may create a user interface from the parameters defined in the modes. The user interface may be automatically generated so that the information technology professional does not have to write any code other than the annotated script model. The user interface may be populated by user interface devices, such as text boxes, drop down menus, integer or real number input devices, or other user interface mechanisms. The user interface mechanisms may additionally have proper type checking, boundary checking, and default settings as defined in the annotations or metadata about the parameters in the model.

The device 102 may be a server computer or other computer device within a network environment. The device 102 may gather and validate information about other devices within a network, which may include a local area network and a wide area network in some cases.

Embodiment 100 illustrates a single device 102 that may perform all of the data gathering and validation operations. In other embodiments, such operations may be spread across multiple devices in some cases.

The device 102 may have various hardware components 104 and software components 106. The architecture illustrated may be representative of a conventional computer device. Other architectures and component configurations may also be used.

The hardware components 106 may include a processor 108 that may use random access memory 110 and nonvolatile storage 112. The hardware components 104 may also include a network interface 116 as well as a user interface 118.

The software components 106 may include an operating system 120, which may provide an abstraction layer for the hardware components 106 as well as various file management functions, network connectivity functions, and other services used by various applications.

A set of models 122 may define the actions that the device 102 may perform. The models 122 may include discovery script templates 124, validation script templates 126, and various parameter metadata 128, which may include type definitions 130. The models 122 may include localization information 132 in some cases.

The models 122 may be created for gathering information from specific types of information from specific types of devices. For example, a model may be created for gathering information from a server that acts as a domain controller, while another model may be created for gathering information from a mail server, while still another model may be created for gathering information from a security server. Each model may include scripts that are specific to that type of device and may further be customized or specific to different software or even versions of software running on the device.

The discovery script templates 124 may be scripts, command-lets, script portions, templates, or any portion of a script that may be used create a functioning script to perform an action or set of actions. In many cases, the scripts may be interpreted using a command shell or other scripting engine that has a form of a scripting language.

Similarly, the validation script templates 126 may be defined in a scripting language. In some cases, portions of the discovery script templates 124 or the validation script templates 126 may include other types of executable code, including executable object code, which may include compiled intermediate code, machine code, assembly code, or other executable code. In many cases, the other types of executable code may be callable from a script portion of a validation scrip template.

The discovery script templates 124 may perform data gathering from various devices. In some cases, the gathered data may be configuration data about hardware or software on a device that may be used to manage the device. These data may include the presence of various hardware or software components, model numbers or versions of the components, specific configuration settings used by the components, as well as various current or historical data about the operation of the components.

The validation script templates 126 may perform data validation on the results obtained from the discovery scripts. The data validation scripts may analyze, evaluate, and give some summary results of the data. The data validation scripts may also prepare the data into forms that may be used by other applications, including various monitoring applications, for example.

The discovery script templates 124 may be annotated with various parameters. The parameters may have various metadata defined within the script templates or separately in a parameter metadata 128 definition. The parameters and parameter metadata may be used to select user interface mechanisms, populate those mechanisms, set default values, determine acceptable ranges for input values, perform type checking, and other functions.

The parameters may also be found in the validation script templates 126. In some cases, the validation script templates 126 may have variables or items that may change between different runs of the validation scripts. The parameters may be used to perform the validation in different manners, to use different limits or acceptance regions, or for other input used to customize the validation scripts.

The parameters may include type definitions 130. The type definitions 130 may define simple types, such as Boolean, integer, real number, string, or other standard types. In some cases, the type definitions 130 may include complex type definitions that define, for example, three different levels for analysis as low, medium, and high. The complex type definitions may be used to populate user interface mechanisms such as drop down boxes with the acceptable levels. In some embodiments, the type definition 130 may include schema that define the type.

The type definitions 130 may be used to perform type checking or type validation prior to processing user input. The user input may be used to create a script that may be executed, for example. The user input may be compared to the type definition to ensure that the user input matches the expected type.

The models 122 may include localization information 132. The localization information 132 may be groups of text strings or other items that may be used to customize a user interface or output results for a particular language or location. In some cases, the localization function 132 may have sets of text strings that correspond with different languages or locations. For example, one set of text strings may be for US English, another for UK English, and others for Spanish, French, and Chinese.

The localization information 132 may also include definitions for how a user interface may be configured to display certain items. For example, the localization information may include an indicator that indicates whether a language is displayed from left to right, such as English, or from right to left, such as Hebrew or Arabic.

A user interface engine 134 may create a user interface 136 that may capture parameter values 138. The user interface engine 134 may analyze the models 122 to gather all of the applicable parameters and create a user interface through which a user may define those parameters. In many cases, the user may be entering parameter values, such as machine names, access credentials, or other options that may be entered using a text box or number entry mechanism. In some cases, the user may be selecting from various options through radio buttons, drop down list, or other entry mechanism.

For each of the various parameters, the user interface engine 134 may analyze the metadata associated with the parameters to determine a data type as well as other options. In some cases, the metadata may define certain elements of a user interface mechanism. From these metadata, the user interface engine 134 may select an appropriate user interface mechanism, such as a text box, drop down list, combination box, list box, radio button, check box, or many other user interface mechanisms.

One the user interface mechanism is identified, the user interface engine 134 may populate the user interface mechanism with optional values, limits on the acceptable range of values, and other factors. In some cases, the user interface mechanism may be pre-populated with a default value that may or may not be able to be changed by a user.

The user may interact with the user interface 136 to determine the various parameter values 138. The parameter values 138 may be used in several different manners. In one use, the parameter values 138 may be used to populate discovery scripts which may gather information from other sources. The parameter values 138 may also be used to customize or modify validation scripts for analyzing the gathered information.

A script engine 135 may use the parameter values 138 to create customized discovery scripts 140. The customized discovery scripts 140 may be created from the discovery script templates 124 by populating the parameters within the scripts with the parameter values 138 received from a user. In some embodiments, the discovery script templates 124 may include placeholders for specific parameters. Once those parameters are received from the user as parameter values 138, the script engine 135 may replace the placeholders with the actual values to create a customized discovery script 140.

In some embodiments, the script engine 135 may perform various functions or modifications to the parameter values 138 in order to populate a discovery script template. For example, a discovery script template may include an expression or function that may combine two or more parameters to create a value that may be inserted into a discovery script template. In another example, such an expression may perform an arithmetic operation on a number value to determine a value to place in a template.

The set of customized discovery scripts 140 may be scripts capable of communicating with another device and gathering information from that device. The scripts may communicate with hardware devices, operating system components, applications, services, or other operational components on the remote device. The scripts may collect configuration information, such as the presence of certain components, as well as the version identifiers or model numbers of the components.

The scripts may also collect configuration information about components on remote devices. For example, the scripts may perform queries against the components to determine various settings, or may examine configuration files or perform tests against the components to determine if certain functionality is present.

The scripts may collect operational information about the components. For example, the scripts may determine a status of a component, such as whether the component is operational or in an error state. The scripts may examine log files to determine summary statistics for operations performed by the component or faults detected by the component. The scripts may perform queries against the component to gather operational information as well.

A discovery script launcher 142 may cause the customized discovery scripts 140 to be executed. The executing scripts may operate on the device 102 or may be transferred to a remote device and executed by that device in some cases. The discovery script launcher 142 may receive results from the scripts and store the results files 144 for later processing.

In some embodiments, the discovery script launcher 142 may cause the scripts to be executed at some time after the customized discovery scripts 140 are created. One example embodiment may have a scheduler that may cause discovery scripts to be executed at certain times. In a business enterprise, a scheduler may be used to execute discovery scripts during non-business hours, for example.

The discovery script launcher 142 may be configured to execute the various scripts on a repeating basis. For example, some scripts may be executed each evening or once a week. Such a system may be configured to maintain a set of customized discovery scripts 140 and execute each script on a predetermined frequency.

In some cases, the discovery script launcher 142 may be configured to launch a script in response to a specific event or condition. The event or condition may be defined by results received from another discovery script or by an outside event. For example, a set of customized discovery scripts may include a general status script that determines whether a monitored device is operating normally. When the general status script determines that a problem exists with the monitored device, the discovery script launcher 142 may launch a detailed script that may examine the device in detail or collect information that may assist in isolating the problem.

The results files 144 may store the results from various customized discovery scripts and may be processed by a data validator 148 to generate output 150. The output 150 may be displayed on the user interface 136. The data validator 148 may use customized validation scripts 146 that may be customized by the script engine 135.

The data validator 148 may examine the results files 144 to identify conditions or produce summary statistics from the results gathered by the customized discovery scripts 140. The summary statistics may be prepared with localization information so that a user may view the results in a meaningful and understandable manner for that user's language and culture.

In many cases, the validation script templates 126 may use the same scripting language, syntax, and structure as the discovery script templates 124, as well as the same annotations for various parameters. Some embodiments may include certain analysis routines or functions that may be called from a script, which may be a library of executable functions that may be called by a script. Such functions may allow data to be passed to the function and may return other data.

The device 102 may communicate across a local area network 152 to gather information from servers 154 and client 156. In some cases, the device 102 may communicate across a gateway 158 to communicate across a wide area network 160, which may be include the Internet. In such cases, the device 102 may gather information from various remote servers 162, remote clients 164, and remotely hosted web services 166.

The data gathering functions may gather information from any type of network connected device. Servers 154 and 162 may provide services or data that are consumed by other devices, which may be the clients 156 and 164. In some cases, various other network connected devices, such as routers, gateways 158, proxies, network appliances, network storage devices, wireless access points, game consoles, or any other device attached to the network may be queried to determine configuration, status information, or other data.

The models 122 may define the scripts and analyses used to communicate with a certain range of devices. In some cases, the range of devices may be quite broad, such as any device that uses a specific brand of operating system. In such cases, the model may be capable of detecting many data points that are common to devices using the specific operating system and may be customized to address specific versions of the operating system or devices that have a specific subset of features.

In some cases, the models may be directed at specific types of devices that perform specific functions with specific software. For example, a manufacturer of a messaging server may create a model that gathers information from only that manufacturer's messaging server software and may not apply to other manufacturer's messaging server software. In some cases, a model may be capable of only operating against a certain version of the manufacturer's messaging software, for example.

Figure 2:
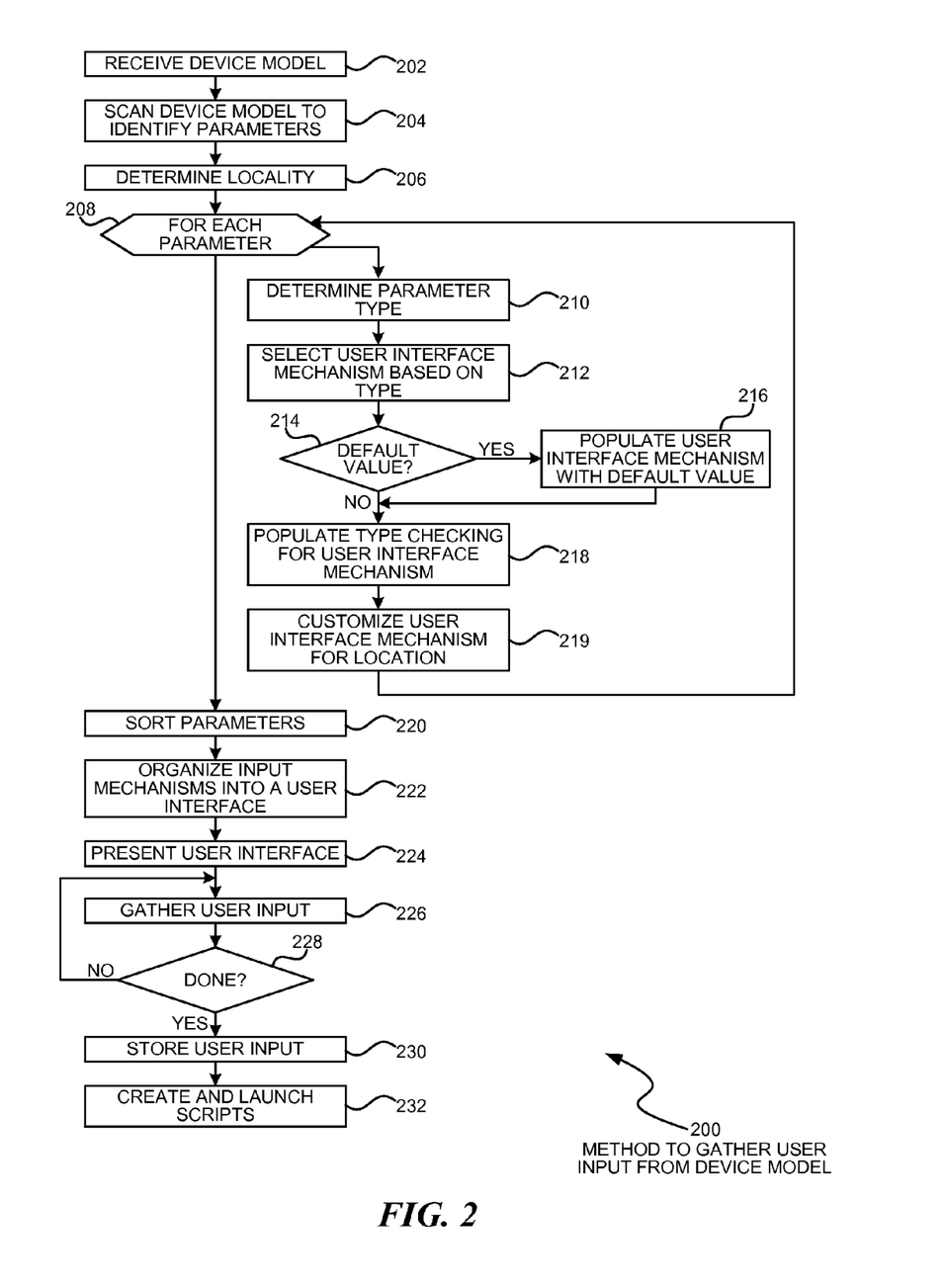
FIG. 2 is a flowchart illustration of an embodiment showing a method for gathering user input from a device model.

FIG. 2 is a flowchart illustration of an embodiment 200 showing a method for gathering user input from a device model. Embodiment 200 is a simplified example of a method that may be performed by a user interface engine, such as the user interface engine 136 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is an example of a method that may be performed to identify parameters from a model, create a user interface from the parameter metadata, and gather user input using the user interface.

A device model may be received in block 202. The device model may be scanned to identify parameters in block 204. The device model may include various script templates, such as discovery script templates and validation script templates. The script templates may include optional parameters. The parameters may be defined using a specific syntax or manner so that a user interface engine may identify the parameters.

In many cases, the parameters may be defined with metadata that may include data types, acceptable input ranges or options, default values, and other descriptors that may be used to create a user interface from the parameters.

In block 206, a current locality may be determined. The locality information may include a physical location, language selection, and other cultural preferences. The locality information may be used to select text descriptors and other customizations so that the user interface is readable, usable, and comfortable to each user.

Each parameter may be analyzed in block 208. For each parameter, a parameter type may be determined in block 210 and a user interface mechanism may be determined by selecting a user interface mechanism according to the type in block 212.

A user interface mechanism may be any mechanism that may be displayed on a user interface to collect data. Examples may include text boxes, checkboxes, radio buttons, drop down lists, and other mechanisms. The user interface mechanism may have several parameters or options that may be populated. Once the user interface mechanisms are populated, they may be arranged and presented to a user.

If the parameter is defined with a default value in block 214, the user interface mechanism may be populated with the default value in block 216. In some cases, the default value may be defined so that the user may be able to edit the default value. In other embodiments, the default value may not be editable or changeable by the user. Some such embodiments may display the user interface mechanism with the default value, while other embodiments may not display the user interface mechanism at all, thereby hiding the parameter from the user.

The user interface mechanism may be populated in block 218 with type checking The type checking may include merely checking that the received information conforms to a specific type. For example, a textbox input mechanism may permit input for string data, while a checkbox may permit input for only Boolean data. In some embodiments the user interface mechanism may include validation using various functions, schema, or other expressions.

In some embodiments, the type checking may also include ranges for acceptable values. For example, a numerical input device may be populated with acceptable ranges of data, such as integer numbers from one to ten. The type checking in such a case may ensure that only data within the predefined range are accepted by the user interface mechanism.

Many user interface mechanisms may include text strings, descriptors, and other options that may be affected by the locality of use. These localization strings or other options may be configured in block 219.

Each parameter may be processed in block 208 to create populated user interface mechanisms.

The parameters may be sorted or grouped in block 220. The parameters may be sorted by any manner. In some cases, the parameter metadata may define a priority or grouping for various parameters. In other cases, the parameters may be sorted or grouped by the associated discovery script template or validation script template to which the parameter may be associated.

During the sorting or grouping operation in block 220, duplicate parameters may be identified. In some cases, a single parameter may be used in multiple discovery scripts and multiple validation scripts. During the sorting or grouping operation, the duplicate parameters may be consolidated into a single user input mechanism.

The user interface may be organized according to the sorted order or grouping in block 222 and may be presented on a user interface device in block 224.

User input may be gathered in block 226. During the operations of block 226, the user input may be type-checked using the valued populated in block 218. When a value does not conform to the type checking, the user input may be rejected until a value meeting the type definitions is received. If more user input is desired in block 228, the process may loop back to block 226.

Figure 3:
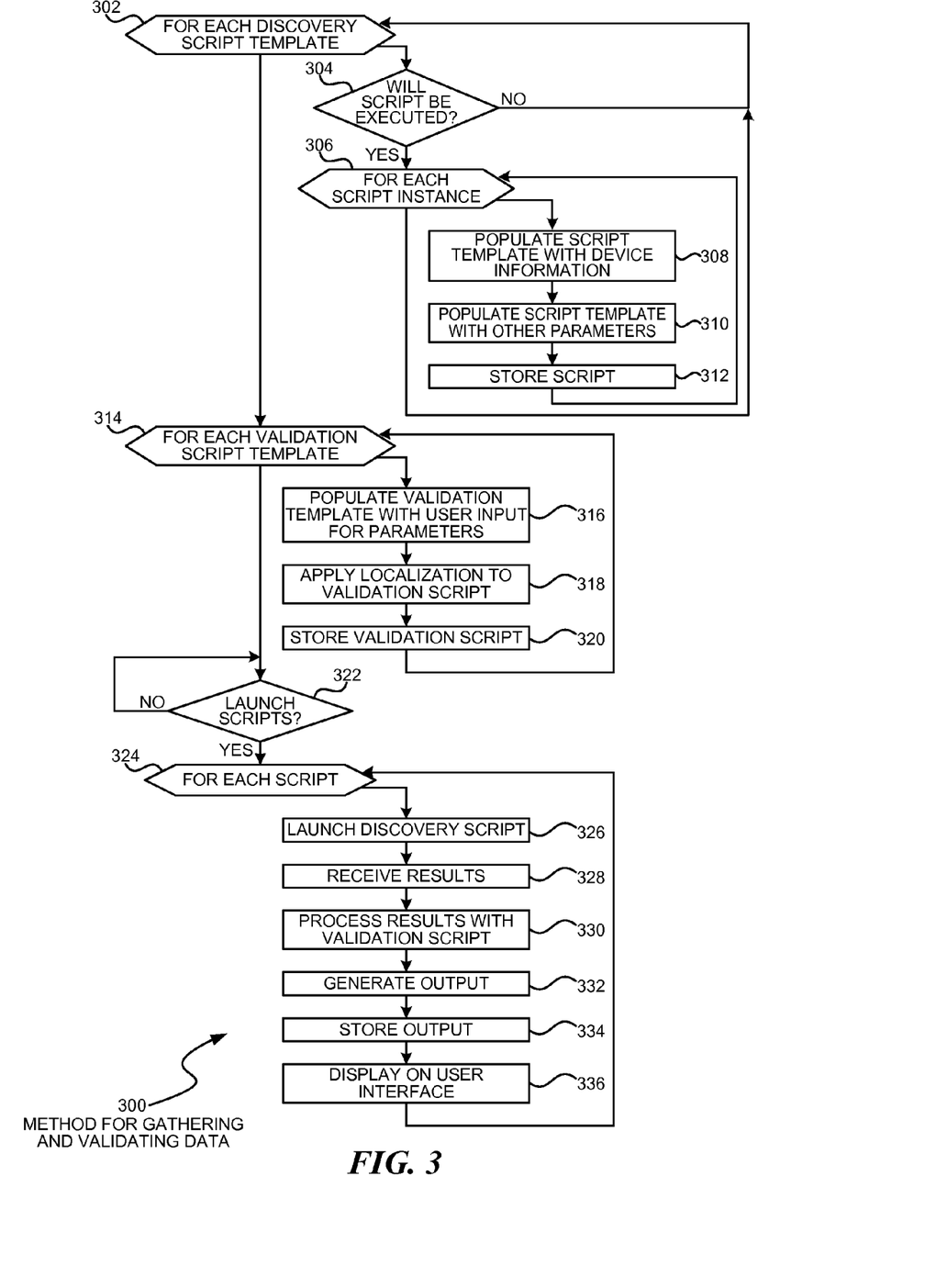
FIG. 3 is a flowchart illustration of an embodiment showing a method for gathering and validating data.

When no more input is to be performed in block 228, the user input may be stored in block 230. The user input may be used to create and launch scripts in block 232. An example method for creating and launching scripts may be illustrated in embodiment 300.

FIG. 3 is a flowchart illustration of an embodiment 300 showing a method for gathering and validating data. Embodiment 300 may create and launch discovery scripts and validation scripts, and may represent the operations of block 232 of embodiment 200 as well as a script engine, such as script engine 135 as well as other components illustrated in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates one method by which scripts may be customized using the user input from a user interface. The customized discovery scripts may be executed, and then the results may be processed using customized validation scripts.

Each discovery script template may be processed in block 302. For each discovery script template, if that script will not be executed in block 304, the process may return to block 302. In some embodiments, a subset of the available discovery script templates may actually be executed. The determination of which scripts to execute may be determined from the user input received in some cases.

If the script will be executed in block 304, there may be multiple instances of the script. For example, a user input may define several server devices from which information may be gathered. For each of the server devices, a separate instance of the discovery script may be created.

In a typical use scenario, each instance of the discovery script may refer to a different server device and may include customizations for that server device. For example, the customization may include the server network address as well as information that may be used to gather specific information based on differences between the individual servers.

Each script instance may be processed in block 306 by populating the script template with device specific information in block 308 and other parameters in block 310. The script may be stored in block 312.

Once all instances of all the discovery script templates are processed, the validation script templates may be processed in block 314. The validation scripts may be created by populating the validation script templates with the user input for the various parameters in block 316. The validation scripts may have localization options applied in block 318 and may be stored in block 320.

Once all the discovery scripts and validation scripts have been created and stored, the decision to launch the scripts may be made in block 322. If the scripts are not to be launched, the process may loop on block 322.

The scripts may be launched using a scheduling mechanism that may delay launch until a specific time has arrived or some event or condition occurs. In some embodiments, some scripts may be launched repeatedly on a predefined basis.

Each script that is launched may be processed in block 324. The discovery script may be launched in block 326 and results from the script may be received in block 328. The results may be processed using a validation script in block 330 and output may be generated in block 332. The validation script may include type validation, among other validation actions. The output may be stored in block 334 and displayed on a user interface in block 336.

In some embodiments, the operations of the script processing in blocks 326 through 336 may be performed by different devices. For example, one device may cause the scripts to be launched, and a second device may receive and process the results. In such an embodiment, the user interface that was used to collect the user input may not be the same user interface used to display the analyzed output from block 334.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computing device, the computing device including a processor and system memory, a method for monitoring a device, the method comprising:
   receiving a parameterized device model for a device type, said parameterized device model describing mechanisms for collecting and validating data for said device type, said parameterized device model comprising:
   a discovery script template;
   a data validation script template;
   one or more parameters defining how one or more of said discovery script template and said data validation script template are to be customized to monitor a specified device of said device type based on corresponding parameter values for said one or more parameters; and
   parameter metadata defining restrictions on parameter values for said one or more parameters;
   creating a user interface from said parameterized device model to capture parameter values for said one or more parameters, said user interface comprising appropriate user input controls for receiving parameter values for said one or more parameters in accordance with said restrictions defined in said parameter metadata;
   receiving user input for said one or more parameters at said user interface, said user input including parameter values for said one or more parameters, said parameter values relevant to monitoring said specified device and in compliance with said defined parameter value restrictions;
   creating executable scripts for monitoring said specified device, including creating an executable discovery script from said discovery script template and creating a executable data validation script from said data validation script template, and including;
   using said parameter values to customize at least one of said executable discovery script and said data validation script for use with data monitored from said specified device;
   executing said executable discovery script to gather device data from said specified device; and
   executing said executable data validation script to verify said device data.

2. The method of claim 1 wherein using said parameter values to customize at least one of said executable discovery script and said data validation script for use with data from said specified device comprises using said parameter values to customize said executable discovery script.

3. The method of claim 1, said parameter metadata comprising type definitions for said one or more parameters.

4. The method of claim 3, said type definitions being used by said user interface to collect said user input according to said type.

5. The method of claim 1, said parameter metadata defining a default value for at least one of said one or more parameters.

6. The method of claim 1, said parameterized device model further comprising localization information, said method further comprising:
   determining a locality;
   selecting a local descriptor for said one or more parameters; and
   presenting said local descriptor in said user interface for said ast one or more parameters.

7. The method of claim 6 further comprising:
   presenting an output comprising said device data after said verifying, said output comprising a second local descriptor from said localization information.

8. The method of claim 1, wherein said one or more parameters are annotated to the discovery script template.

9. The method claim 1, wherein using said parameter values to customize at least one of said executable discovery script and said data validation script for use with data from said specified device comprises using said parameter values to customize a script for use with data from one of: a router, a gateway, a proxy, a network application, a network storage device, a wireless access point, or a game console.

10. The method of claim 1, wherein executing said executable discovery script to gather device data from said specified device comprises executing said executable discovery script to gather operational data from said specified device.

11. A system comprising:
    a physical network interface;
    a set of parameterized models, said set of parameterized models describing mechanisms for gathering data from devices, said set of parameterized models comprising:
       discovery script templates for a plurality of different devices;
       for each discovery script template, one or more corresponding parameters defining how said discovery script template is to be customized to monitor a specified device of a specified device type based on corresponding on parameter values for said one or more parameters; and
       for each discovery script template, corresponding parameter metadata defining restrictions on parameter values for said one or more parameters;
    a user interface engine, said user interface engine configured to create a user interface for capturing parameter values including for a selected discovery script template being configured to:
       analyze said discovery script template to identify said one or more corresponding parameters;
       analyze corresponding parameter metadata to determine a typo parameter value restrictions for each of said one or more corresponding parameters;
       creates a user interface to capture parameter values for said corresponding one or more parameters, said user interface comprising appropriate user interface controls for receiving parameter values for said corresponding one or more parameters in accordance with restrictions defined in said corresponding parameter metadata;

presents said user interface; and
receives user input including parameter values for said corresponding one or more parameters through said appropriate user interface controls; and a script engine configured to:
create a customized discovery script for monitoring said specified device of said specified device type by customizing said selected discovery script template with said parameter values for said corresponding one or more parameters;
launch said customized discovery script; and
receives results from said customized discovery script, said results comprising configuration data from said specified device of said specified device type.

12. The system of claim 11 further comprising:
a data validator engine that:
validates said results to create validated output.

13. The system of claim 12, said data validator that further:
creates a validation script from a validation script template and said user input, said validation script being used to create said validated output.

14. The system of claim 12, said set of parameterized models comprising models configured for gathering data from a server computer.

15. The system of claim 14, said user input comprising a first account usable for authenticating with said server computer.

16. The system of claim 15, said user input coming from a first user having a second account, said first account being an administrator account and said user input comprising credentials for said administrator account.

17. The system of claim 16, said set of parameterized models further comprising models configured for gathering data from a group of said server computers.

18. The system of claim 16, said set of parameterized models further comprising models configured for gathering data from a client computer.

19. At a computing device, the computing device including a processor and system memory, a method for monitoring a plurality of devices, the method comprising:
receiving a parameterized device model for a device type, said parameterized device model describing mechanisms for gathering data for devices of said device type, said parameterized model comprising:
a discovery script template meters;
one or more parameters defining how said discovery script template and template is to be customized to monitor devices of said device type based on corresponding on parameter values for said one or more parameters; and
a set of parameter metadata defining restrictions on parameter values, including type information, for said one or more parameters;
creating a user interface from said parameterized device model by:
for each of said one or more parameters: determining said parameter value restrictions on said parameter, including type information, by referring to said set of parameter metadata;
selecting a user interface mechanism according to appropriate for said restrictions, including said type; and
presenting said user interface mechanism as part of said user interface;
presenting said user interface to a user;
receiving user input for said one or more parameters at said user interface, said user input including parameter values for said one or more parameters, said parameter values relevant to monitoring a plurality of target devices of said device type and in compliance with said parameter value restrictions;
creating a customized executable discovery script for monitoring said plurality of target devices by customizing said discovery script template with said parameter values for said one or more parameters; and
executing said customized executable discovery script to gather device data from said plurality of target devices.

20. The method of claim 19, said device model further comprising a validation script template, said method further comprising:
creating a validation script from said validation script template and said user input; and
validating said device data using said validation script.

* * * * *

UNITED STATES PATENT AND TRADEMARK OFFICE
CERTIFICATE OF CORRECTION

| | | |
|---|---|---|
| PATENT NO. | : 8,332,509 B2 | Page 1 of 1 |
| APPLICATION NO. | : 12/709468 | |
| DATED | : December 11, 2012 | |
| INVENTOR(S) | : Robertson et al. | |

It is certified that error appears in the above-identified patent and that said Letters Patent is hereby corrected as shown below:

In the Specification

In column 9, line 23, after "checking" insert -- . --, therefor.

In the Claims

In column 12, line 18, In Claim 6, before "one" delete "ast".

In column 12, line 59, In Claim 11, before "parameter" delete "a typo".

In column 14, line 3, In Claim 19, delete "meters;" and insert -- parameters; --, therefor.

Signed and Sealed this
Tenth Day of February, 2015

Michelle K. Lee
*Deputy Director of the United States Patent and Trademark Office*